May 10, 1932.　　J. A. PROCTOR ET AL　　1,857,867
ELECTRICAL CONDENSER
Filed Nov. 1, 1927
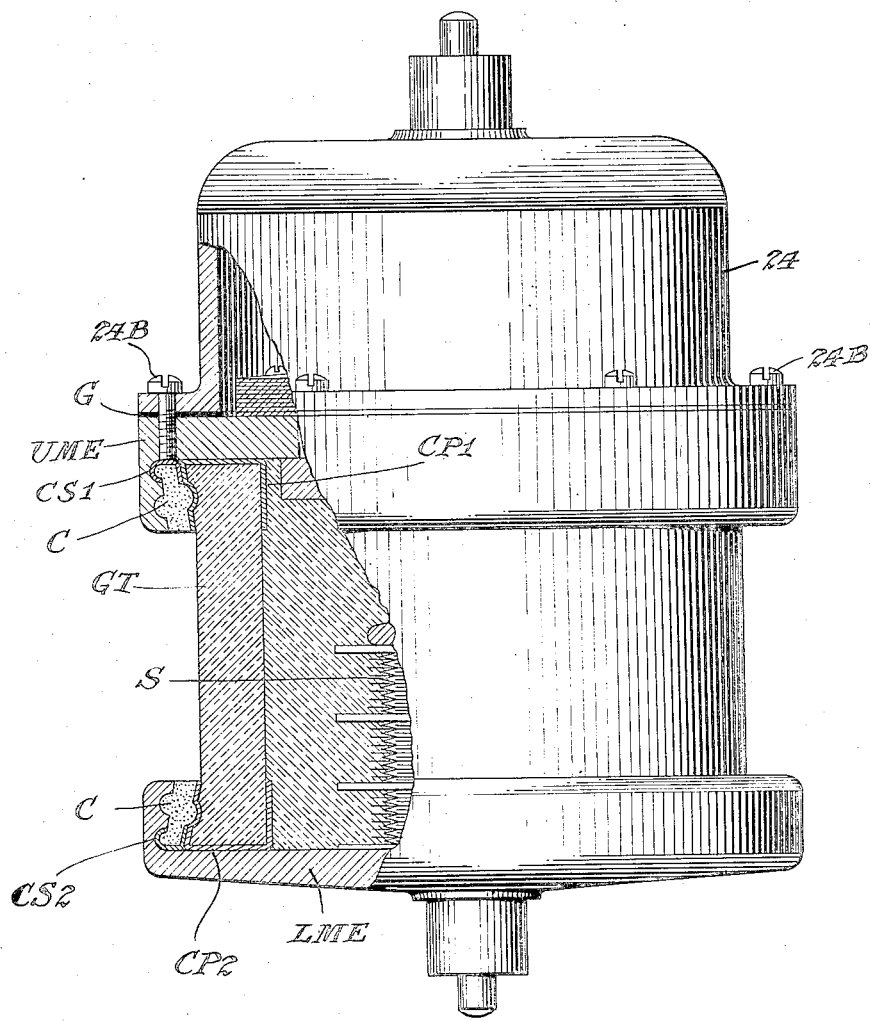
John A. Proctor
William M. Bailey
Inventors
By their Attorney Patented May 10, 1932

1,857,867

UNITED STATES PATENT OFFICE

JOHN A. PROCTOR, OF LEXINGTON, AND WILLIAM M. BAILEY, OF LYNN, MASSACHUSETTS, ASSIGNORS, BY MESNE ASSIGNMENTS, TO GENERAL ELECTRIC COMPANY, A CORPORATION OF NEW YORK

ELECTRICAL CONDENSER

Application filed November 1, 1927. Serial No. 230,221.

The invention relates generally to electric condensers, and more particularly to electric condensers of the high potential type.

High potential electric condensers such as used in radio transmitters are subject to heating due to the influence of the alternating electrostatic stresses set up between the high potential terminals or end structures on the intervening dielectric. This heating causes not only a loss in energy, but in some cases causes undue deterioration of the condenser. In condensers in which the terminals or end structures are cemented to the dielectric, considerable dielectric loss occurs in the cement itself due to its dielectric properties and to its relation to the other parts of the condenser. The dielectric losses in the cement cause undue deterioration of the cement and ultimate failure of the condenser.

According to the invention the difficulties caused by the losses in the cement are eliminated by providing a coating on the dielectric member so related to the terminals and to the cement that the cement is shielded from the electrostatic stress between terminals. The coating is preferably electrolytically deposited, thereby preventing brush discharge between the coating and the dielectric.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which The single figure is an elevation partly in section of a condenser embodying the invention.

In the drawing accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

In the following description and in the claims parts will be identified by specific names for convenience, but they are intended to be as generic in their application to similar parts as the art will permit.

The condenser shown comprises a tubular member GT of dielectric material such as pyrex glass and cup-like end structures UME and LME secured thereto. The upper metal end UME has a cover 24 secured thereto by bolts 24B, a suitable gasket G being interposed. The dielectric tube GT contains a condenser stack S of any well known construction suitably compressed to insure absolute exclusion of air. The casing is filled with suitable dielectric material such as paraffin.

The upper metal end UME comprises a plate portion and a cylindrical portion surrounding the dielectric tube GT. The cylindrical portion and dielectric tube have inclined surfaces disposed in interlocking relationship, these surfaces having annular grooves for the purpose of assisting in the retention of the cement C.

A coating CP1 of metal or other conducting material is provided around the end face and the inner and outer faces of the dielectric tube GT. This coating is preferably copper, deposited electrolytically by dipping the tube in the electrolyte. As shown, the coating extends longitudinally substantially the same distance as the cylindrical portion of the upper metal end. A suitable metal connecting tab CS1 is soldered or otherwise secured to both the upper metal end UME and the coating CP1 to place these members at the same potential.

The manner of securing the lower metal end LME to the dielectric tube GT is substantially the same as that of securing the upper metal end UME to the dielectric tube. The outer face of the dielectric member and the cylindrical portion of the lower metal end are disposed in oblique interlocking relation and have annular grooves therein to assist in retaining the cement. The plate portion of the lower metal end is disposed over the end face of the dielectric tube. The dielectric tube at its lower end is provided with a coating of metal CP2 preferably of copper deposited electrolytically by dipping the dielectric tube in a bath. The plate portion of the lower metal end abuts the coating CP2 and suitable tabs CS2 are provided for insuring electrical connection between the lower metal end and the coating. These tabs CS2 may be conveniently soldered to both the lower metal end and the coating.

Suitable cementitious material C is provided in the space between the cylindrical portions of the lower metal end LME and upper metal end UME respectively and the dielectric tube to securely cement them to the tube. This material may be any of the usual cements used in high tension work.

It will be understood that the terminals of the condenser stack S are connected to the upper metal end and lower metal end respectively, and the full potential across the condenser exists therebetween.

The electrostatic lines of force set up by the high potential between the lower metal end and the upper metal end will be distributed according to the laws of electrostatics, the distribution depending upon the shape of the parts and upon the dielectric properties of the dielectric tube and surrounding mediums. It will be easily understood that, since both sides of the cementitious material C are bounded by metal members which must have the same potential, that no electrostatic stress can exist in this material. It, therefore, follows that this material is subjected to no electric stress but to purely the usual mechanical stress, and therefore the life of the cement and of the condenser is substantially increased. The intimate relation of the metal coatings and the dielectric tube insures elimination of air pockets therebetween and consequent freedom from brush discharge with its attending evils.

Thus it will be seen that an electric condenser is provided having low dielectric loss and therefore low power loss with consequent slow deterioration, the cement bond between the terminals and the dielectric member being fully protected from electrostatic stresses. The condenser gives excellent and efficient service, has long life and enjoys great freedom from breakdown due to deterioration of the cement.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a condenser, a casing comprising a dielectric tube, a metal end structure on each end of said tube, each structure comprising a plate portion disposed over the end face of said tube and a cylindrical portion surrounding the outside face of said tube, a coating of conducting material intimately covering the outside face of said tube at each end, cementitious material between said cylindrical portions and coatings, said coatings being electrically connected to their respective end structures, and a condenser assembly within said casing having its terminals connected to said end structures.

2. In a condenser, a casing comprising a dielectric tube, a metal end structure on each end of said tube, each structure comprising a plate portion disposed over the end face of said tube and a cylindrical portion surrounding the outside face of said tube, a coating of conducting material intimately covering inside, outside and end faces of said tube at each end, cementitious material between said cylindrical portions and coatings, a conducting element connected to said coating and end structure at each end, and a condenser assembly within said casing having its terminals connected to said end structures.

3. In a condenser, a casing comprising a dielectric tube, a metal end structure on each end of said tube, each structure comprising a plate portion disposed over the end face of said tube and a cylindrical portion surrounding the outside face of said tube, said cylindrical portion and side face having oblique interlocking relation and having annular grooves, a coating of electrolytically deposited conducting material covering inside, outside and end faces of said tube at each end, each plate portion abutting the end face coating, cement between said cylindrical portions and coatings, a conducting element connected to said coating and end structure at each end, and a condenser assembly within said casing having its terminals connected to said end structures.

4. A high potential condenser comprising a dielectric casing member, a condenser unit in said casing member, cup-like terminal members, connecting material between the sides of said terminal members and said casing member, and layers of conducting material between said material and said casing member, each layer being connected to the adjacent terminal member for shielding said connecting material from dielectric stress set up between said terminal members.

5. In combination, a dielectric member, a condenser unit within said member, terminals for said unit secured to said member, cementitious material connecting said terminals and member, and means for shielding said material from electrostatic stress comprising electrically connected metal elements contiguous opposite sides of said material to shield the same from said stress.

6. In a high potential condenser, a borosilicate glass casing member, a condenser unit in said casing member, terminal members, means including cement for connecting a terminal member to said casing member, and means for shielding said cement from electrostatic stress set up between said terminals, said means comprising equipotential conductive material contiguous opposite sides of said cement.

7. In a high potential condenser the combination with an insulating member constructed to withstand substantial mechanical stress, of a metal end member therefor, cementitious material which is at least of partial insulating character between the end member and the insulating member, a conductor between the cementitious material and said insulating member and means for electrically bonding said conductor to said end member.

8. In a high potential condenser the combination with an insulating member constructed to withstand substantial mechanical stress, of a metal end member therefor, cementitious material which is at least of partial insulating character between the end member and the insulating member, a conductor between the cementitious material and said insulating member and means for electrically bonding said conductor to said end member, said means including a conductor extending around an unexposed end portion of said cementitious material and connected to said end member and to said first mentioned conductor.

9. In a high potential condenser the combination with an insulating member constructed to withstand substantial mechanical stress, of a metal end member therefor, cementitious material which is at least of partial insulating character between the end member and the insulating member, a conductor between the cementitious material and said insulating member and means for electrically bonding said conductor to said end member, said means including a sheet metal member soldered to said end member and to said first mentioned conductor.

10. In a high potential condenser the combination with an insulating member constructed to withstand substantial mechanical stress, of a metal end member therefor, cementitious material which is at least of partial insulating character between the end member and the insulating member, a conductor between the cementitious material and said insulating member and means for electrically bonding said conductor to said end member, said conductor comprising an electrodeposited layer of metal on said insulating member and covered by said cementitious material.

11. A high potential device comprising a wall of structural insulating material, a metal member secured around said wall with cementitious material, and means for reducing the electrostatic stress within said cementitious material, and including equipotential surfaces contiguous opposite sides of said cementitious material, at least one of said equipotential surfaces being contiguous said insulating wall, and another conductive surface secured on the opposite side of said insulating wall from and at the same potential as said equipotential surfaces.

In testimony whereof we hereunto affix our signatures.

JOHN A. PROCTOR.
WILLIAM M. BAILEY.